US008397267B2

(12) United States Patent
Chapman et al.

(10) Patent No.: US 8,397,267 B2
(45) Date of Patent: Mar. 12, 2013

(54) HI-SPLIT UPSTREAM DESIGN FOR DOCSIS

(75) Inventors: John Chapman, Laguna Niguel, CA (US); Alon Bernstein, San Jose, CA (US)

(73) Assignee: Cisco Techology, Inc., San Jose, CA (US)

( * ) Notice: Subject to any disclaimer, the term of this patent is extended or adjusted under 35 U.S.C. 154(b) by 423 days.

(21) Appl. No.: 12/835,199

(22) Filed: Jul. 13, 2010

(65) Prior Publication Data

US 2011/0185263 A1 Jul. 28, 2011

Related U.S. Application Data

(60) Provisional application No. 61/298,502, filed on Jan. 26, 2010.

(51) Int. Cl.
*H04N 7/173* (2011.01)
(52) U.S. Cl. ............ 725/111; 725/116; 725/118
(58) Field of Classification Search ............ 725/111, 725/116, 118
See application file for complete search history.

(56) References Cited

U.S. PATENT DOCUMENTS

| 6,751,230 | B1 | 6/2004 | Vogel et al. |
| 7,050,419 | B2 * | 5/2006 | Azenkot et al. ............... 370/347 |
| 7,085,287 | B1 | 8/2006 | Chapman |
| 7,085,306 | B1 | 8/2006 | Voldman et al. |
| 7,397,846 | B1 | 7/2008 | Beser |
| 7,548,548 | B2 * | 6/2009 | Rakib et al. ............... 370/419 |
| 8,050,283 | B2 * | 11/2011 | Ladd ............... 370/401 |
| 2005/0031097 | A1 | 2/2005 | Rabenko et al. |
| 2009/0049492 | A1 | 2/2009 | Pantelias |

* cited by examiner

*Primary Examiner* — Kieu Oanh T Bui
(74) *Attorney, Agent, or Firm* — Leon R. Turkevich

(57) ABSTRACT

In one embodiment, upstream transmission throughput in a cable network is markedly increased by moving up the US/DS frequency split by approximately an order of magnitude to a few hundred MHz. Additional transceivers (carriers) may be implemented to take advantage of the broader spectrum. A block of multiple upstream carriers (FIG. 2A) are associated to form a single logical upstream providing a high-bandwidth, in-order packet stream. The carriers have a common start time (704), pursuant to a single MAP message, and operation synchronously to transmit an upstream transmission frame (250). They may use OFDM or discrete carriers. A convergence layer (350) assembles the data from all of the upstream channels (320,322,324) for presentation to the MAC layer logic (308,310) as a single, serial, high-speed transmission from the CM.

19 Claims, 11 Drawing Sheets

FIG. 4 Initial Ranging

FIG. 5 Station Maintenance

FIG. 6 Registration

FIG. 7 Data Transmission

MAC MANAGEMENT MESSAGE                    CM US PROFILE

| Source $_{CMTS}$ | Destination $_{CM}$ | Profile Update | Timestamp | HEADER |
|---|---|---|---|---|
| *Carrier 1* | Power adjust | Frequency adjust | Timing adjust | |
| *Carrier 2* | Power adjust | Frequency adjust | Timing adjust | |
| ... | ... | ... | ... | |
| *Carrier n* | Power adjust | Frequency adjust | Timing adjust | |

FIG. 8

Convergence Layer Engine Logic

HI-SPLIT UPSTREAM DESIGN FOR DOCSIS

RELATED APPLICATION

This application claims priority to U.S. Provisional Patent Application No. 61/298,502 entitled "HI-SPLIT UPSTREAM DESIGN FOR DOCSIS" filed on Jan. 26, 2010, the disclosure of which is incorporated herein by reference in its entirety.

TECHNICAL FIELD

The present disclosure relates generally to the field of cable networks.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. Cable Television Laboratories, Inc. (CableLabs®) publishes detailed technical specifications for such systems, including DOCSIS—Data Over Cable Service Interface Specification.

BRIEF DESCRIPTION OF THE DRAWINGS

FIG. 8 is a simplified example of CM specific, per-carrier upstream carrier block RF parameter profile message.

DESCRIPTION OF EXAMPLE EMBODIMENTS

Overview

Figure 1:
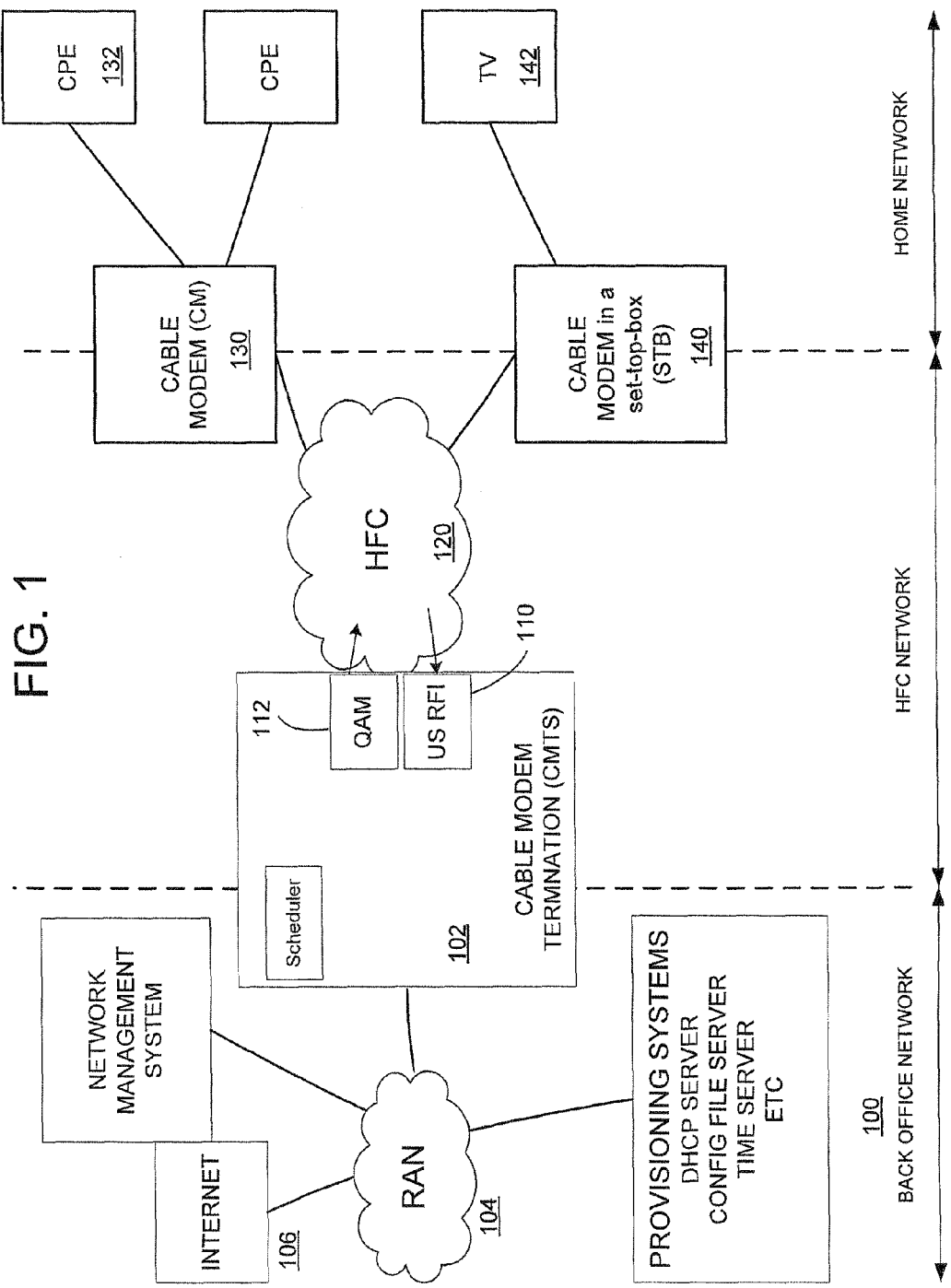
FIG. 1 is a simplified block diagram illustrating an example of a DOCSIS network.

In an embodiment, a Cable Modem Termination System (CMTS) includes a network interface, at least one forwarder coupled to the network interface for forwarding data packets to and from the network interface, and Media Access Control (MAC) layer logic for managing data transmission services between the forwarders and a set of CMs. The CMTS further includes a plurality of upstream RF channel interfaces for receiving respective upstream carrier transmissions from a CM. A plurality of the upstream carriers may be designated as a group or block for concurrent, synchronous use by a single CM for US transmission. In the CMTS, a convergence layer logic is implemented for receiving upstream transmissions from the upstream RF channel interfaces, and assembling data from all of a designated block of upstream carriers for presentation to the Media Access Control (MAC) layer logic as a single stream.

A Cable Modem apparatus (CM), in an embodiment, implements transceivers for transmitting and receiving RF signals, to use a plurality of RF carriers at different center frequencies, and receives an upstream configuration profile from a CMTS that designates at least two of the RF carriers for use together as a logical upstream carrier block. The CM further operates the transceivers to transmit data upstream concurrently and synchronously over all of the designated carriers of the logical upstream carrier block, all of the designated carriers beginning and ending transmission at substantially the same time.

Upstream access in a cable system includes receiving an upstream bandwidth request from a CM in terms of bytes; converting the upstream request into time, based on a carrier configuration profile associated with the requesting CM, wherein the configuration profile includes symbol rate and modulation parameters for each one each of a block of carriers; responsive to the converted request, granting time to the requesting CM, wherein the time allocation applies over of the block of carriers; transmitting a single MAP message to the requesting CM specifying a common start time for all of the block of carriers; and receiving an upstream transmission from the CM based on the MAP message, wherein the upstream transmission is received over all of the block of carriers concurrently, beginning at the common start time.

DESCRIPTION

Several preferred examples are described with reference to the accompanying drawings. Various other examples are also possible and practical.

The figures listed above illustrate examples of some of the applications and operation of embodiments of this disclosure. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

Referring to FIG. 1, in typical cable systems 100, a Cable Modem Termination System (CMTS) 102 (or a modular CMTS called "M-CMTS") connects the cable network to a Regional Area Network (RAN) 104, which may in turn connect to the Internet 106. A downstream Quadrature Amplitude Modulation (QAM) 112 receives data transferred from the CMTS over a packet switched portion of the network, performs modulation and other processing, and then transfers the modulated data over a Hybrid Fiber Coaxial (HFC) portion 120 of the cable network to subscribers. This is called the "downstream" direction. In the upstream direction, data transmitted Cable from Modems (CMs) traverse the HFC to upstream RF interfaces (US RFI) 110 in the CMTS, where they are processed and forwarded to the RAN.

In general, this HFC or coax cable feeds the last link (for example, over the last half mile or less) to an individual home or other structure. There, a Cable Modem (CM) 130 may provide a packet interface, for example Ethernet compliant, to various Consumer Premises Equipment (CPE) 132 such as a home router. The CM may be connected to a hub or router (not shown), for example to implement a home network, wireless access, etc. The CM (or a second CM) may be implemented in other equipment, for example a "Set-Top-Box" (STB) 140 which provides an interface to a television 142.

DOCSIS specifies that the cable modems obtain upstream bandwidth according to a request/grant scheme because the upstream channel is shared. A cable modem sends a bandwidth allocation request when it receives a packet from a subscriber device and the packet needs to be sent upstream into the cable network. The CMTS scheduler grants these requests using bandwidth allocation map ("MAP") messages. MAP messages inform the CMs about specific allocations of upstream spectrum in the time dimension, using time slots or "minislots." The requesting modem then waits for its scheduled time before it can begin transmission. In this way, the system avoids collisions in upstream transmissions from multiple CMs. Since the upstream is scheduled bandwidth, a Constant Bit Rate (CBR) service can be established by the CMTS scheduling a steady stream of grants. These are referred to as unsolicited because the bandwidth is predetermined, and there are no ongoing requests being made. The classic example of a CBR application is Voice over Internet Protocol (VoIP) packets.

Cable modems are assigned to operate over various RF carriers, as determined in a "ranging" or registration process. More than one CM may actually transmit on the same carrier, but the upstreams are separated by multiplexing techniques such as Advanced Time Division Multiple Access (ATDMA) or Frequency Division Multiple Access (FDMA). DOCSIS 3.0 also allows a single CM to transmit on multiple upstreams (channels), using "channel bonding". In other words, a DOCSIS 3.0 enabled CM would have multiple transmitters at the CM and multiple receivers at the CMTS simultaneously operable at different frequencies. Still, spectrum and effective bandwidth are limited.

A DOCSIS MAC Domain is a logical sub-component of a CMTS that is responsible for implementing all DOCSIS functions on a set of downstream channels and upstream channels. A CMTS Media Access Control (MAC) Domain contains at least one downstream channel and at least one upstream channel. A MAC Domain is responsible for sending and receiving all MAC Management Messages (MMMs) to and from a set of CMs that are registered on that MAC Domain. A CM is registered to only a single MAC Domain at any given time. A MAC Domain provides layer 2 data transmission services between the CMTS Forwarders and the set of CMs registered to that MAC Domain. The MAC Domain classifies downstream packets into downstream "service flows" based on layer 2, 3, and 4 information in the packets. The MAC Domain schedules the packets for each downstream service flow to be transmitted on its set of downstream channels.

In the upstream direction, the MAC Domain indicates to a CMTS Forwarder component when a Layer 2 packet has been received from a particular CM. Each CMTS Forwarder component is responsible for forwarding and replicating (if necessary) Layer 2 packets between the MAC Domains and the NSI port(s) of a CMTS (see FIG. 1).

An "upstream channel" is sometimes used to refer to either a "Physical Upstream Channel" or a "Logical Upstream Channel" of a Physical Upstream Channel. A "Physical Upstream Channel" is defined as the DOCSIS RF signal at a single center frequency in an upstream carrier path. Multiple "Logical Upstream Channels" can share the center frequency of a Physical Upstream Channel, but operate in different subsets of the time domain. Transmit opportunities for each Logical Upstream Channel are independently scheduled by the CMTS, using MAP messages. In the upstream, physical channels are also called "carriers."

A MAC Domain provides upstream DOCSIS data forwarding service using the set of logical upstream channels (as defined above) associated with the MAC Domain. Each logical upstream channel in a MAC Domain is assigned an 8-bit Upstream Channel ID (UCID). All logical upstream channels operating on the same physical channel on an Upstream RF Interface port are contained in the same MAC Domain.

In known DOCSIS systems, such as current HFC cable systems, upstream throughput is limited. In addition, management of upstream transmission capacity is complex. Simplified protocols and increased upstream throughput are needed to support future growth.

One embodiment is directed to improvements in DOCSIS upstream transmission technologies to improve throughput. By increasing the HFC plant throughput, especially on the upstream side, migration to other technologies may be postponed or eliminated, resulting in substantial cost savings.

In an embodiment, old standards are superseded by a new paradigm, called "Hi-split Upstream" because it moves the standard "split" or allocation between downstream (DS) and upstream (US) flows to much higher frequencies than are currently used. Currently, upstream frequencies comprise 5-42 MHz in the U.S., 5-65 MHz is the European standard, and 5-88 MHz is a proposed new DOCSIS 3.0 upstream standard. Downstream carriers currently operate above 65 MHz in the U.S. and above 88 MHz in Europe.

An embodiment calls for expanding the range of upstream carrier frequencies to approximately 5-200 MHz. This increases the number of upstream carriers that may be utilized (assuming carriers widths similar to those currently in use). Preferably, HFC downstream carriers are allocated to a range of approximately 240 MHz-1000 MHz. The range 200 MHz-240 MHz acts as a guard band in some embodiments between the upstream spectrum and the downstream spectrum. These specific frequencies are not critical but are merely illustrative. This expanded frequency range enables use of more carriers.

The present disclosure simplifies some protocols, thus reducing MAC layer signaling overhead, while improving performance. More specifically, in a preferred embodiment, multiple RF upstream carriers may be managed as one logical block. In an embodiment, a new convergence layer or Physical (PHY) layer technique maps payload bits across the block of carriers in the CM. All the carriers in the block transmit upstream concurrently, starting at the same time, so they are synchronized.

In the CMTS, a peer convergence layer reassembles the data from all of the upstream channels for presentation to the MAC layer logic as though it were a single, serial, high-speed transmission from the CM. The upstream channel blocks may be reflected in configuration files as further explained below. Some embodiments of the present technology may be implemented by modifications to the MAC and PHY layer protocols. Other aspects may be implemented by modifications to CMTS and to CM internal operations, which in turn may be accomplished by changes to hardware, software (firmware), or a combination of the two. For example, some embodiments may be reflected in changes to one or more of: (a) initial ranging operations; (b) station maintenance operations; (c) registration of CMs; and (d) data transmission operations, including in particular bandwidth request/grant mechanisms. Each of these is further discussed below. Preferably, the convergence layer "engine" described below may be implemented in hardware for high speed.

Common Block Concept

DOCSIS 3.0 specifies that cable modems obtain upstream bandwidth allocations according to a request/grant scheme because the upstream channel is shared. A cable modem sends a bandwidth allocation request when it receives a packet from a subscriber device and the packet needs to be sent upstream into the cable network. The CMTS scheduler grants these requests using bandwidth allocation map ("MAP") messages. MAP messages inform the CMs about specific allocations of upstream spectrum in the time dimension, for example using time slots or "minislots." A MAP message is used to schedule each upstream channel. The requesting modem then waits for its scheduled time before it can begin transmission. In this way, the system avoids collisions in upstream transmissions from multiple CMs.

As mentioned, individual CMs are assigned to specific upstream frequency "channels" or RF carriers. In this way, more than one CM may actually transmit at the same time, but they are separated by ATDMA and sometimes FDMA. DOCSIS 3.0 also allows a single CM to transmit on multiple upstreams (channels), called "channel bonding," but channel bonding involves substantial overhead and complexity. In some newer wideband CMs, a single transmitter may be tunable over multiple channels, within a given frequency range. A DOCSIS 3.0 CM can typically operate on at least four frequency carriers concurrently. Still, each channel is configured and scheduled independently, again adding to complexity and scheduling traffic overhead.

By contrast, in one embodiment of the present disclosure, all upstream carriers (to a given CMTS), or a defined subset of them, are treated as a single logical block. A MAP message may still be used to grant bandwidth, as further discussed below, but a single MAP message may be used to schedule all of the carriers of the block at one time. The grant, expressed in terms of time, may still use minislots, but they are not needed for time multiplexing. Alternatively, DOCSIS or other system clock "ticks" may be used. A single, common start time is specified in the MAP message, for the start of transmission on all the carriers of the block.

Each carrier within the same block may have its own symbol rate, modulation, and other parameters. In one embodiment, the system may adopt Orthogonal Frequency-Division Multiplexing (OFDM). In other embodiments, discrete carriers are used. In either case, there will be a per carrier configuration. The following Table 1 illustrates one example.

TABLE 1

SAMPLE BLOCK OF CARRIERS

| CARRIER | SYMBOL RATE | MODULATION |
| --- | --- | --- |
| Carrier f1 (legacy) | 2.56 Msymbol/sec | 16-QAM |
| Carrier f2 (New 100 MHz) | 1.28 Msymbol/sec | QPSK |
| . . . | 0.32 Msymbol/sec | 16-QAM |
| Carrier fn (New 150 MHz) | 1.28 Msymbol/sec | 64-QAM |

PHY Layer Considerations

The upstream is limited in current implementations to about 4-6 carriers. Under the present proposal, the number of upstream carriers may be expanded, for example, to 24 carriers. This particular number of carriers is not critical; it is merely illustrative. The additional carriers may be accommodated by moving the US/DS split to a much higher frequency as mentioned above. Appropriate hardware upgrades may be required at the physical level. For example, changes may be needed in the CMTS, diplexers, network amplifiers, fiber nodes, and CMs. Various embodiments of the this disclosure may be expected to increase upstream throughput to the order of 1 Gbps.

In an embodiment, carriers may be arranged to co-exist with legacy systems by leaving 5-42 MHz for D3.0 carriers and using 50-200 MHz frequency spectrum, for example, for new designs. New protocols can be implemented for use on the new carriers, and gradually phase out the legacy designs.

Preferably, only one modulation strategy should be used for all RF channels within a common block. In other embodiments, combinations of modulation strategies, symbol rates, etc. may be used, but they may be restricted to enforce simplicity. Options for modulation include but are not limited to individually managed carriers (similar to DOCSIS 3.0 carriers) or OFDM and C-OFDM (coded OFDM).

One preferred carrier strategy is for only one CM to transmit at one time. The CM transmits on one, some or all of the carriers in the assigned block. This may be implemented in various ways. In accordance with one approach, all the CMs use the same number of carriers, all at the same data rate. In an alternative, more flexible approach, each CM may use its own unique number of carriers where each carrier can have a different symbol rate, modulation and channel width. Thus, each CM may have its own unique carrier configuration. This permits optimization where closer CMs (to the CMTS) could get better performance than more distant CMs.

In some embodiments, power management may be appropriate at the CM. In some CM implementations, they may not be able to transmit on all channels continuously due to thermal considerations. To address this, in one embodiment, the CM is responsible for managing power and environmental conditions. It may measure the local temperature of the transmit stage, for example, and pace its transmission accordingly. Preferably, the CM shuts down the transmit amplifier if nothing is being sent, to enable cooling and conserve energy. In another embodiment, the CM sends a "power profile" to the CMTS. The CMTS manages the CM based upon this profile.

Convergence Layer on the CMTS

Figure 3:
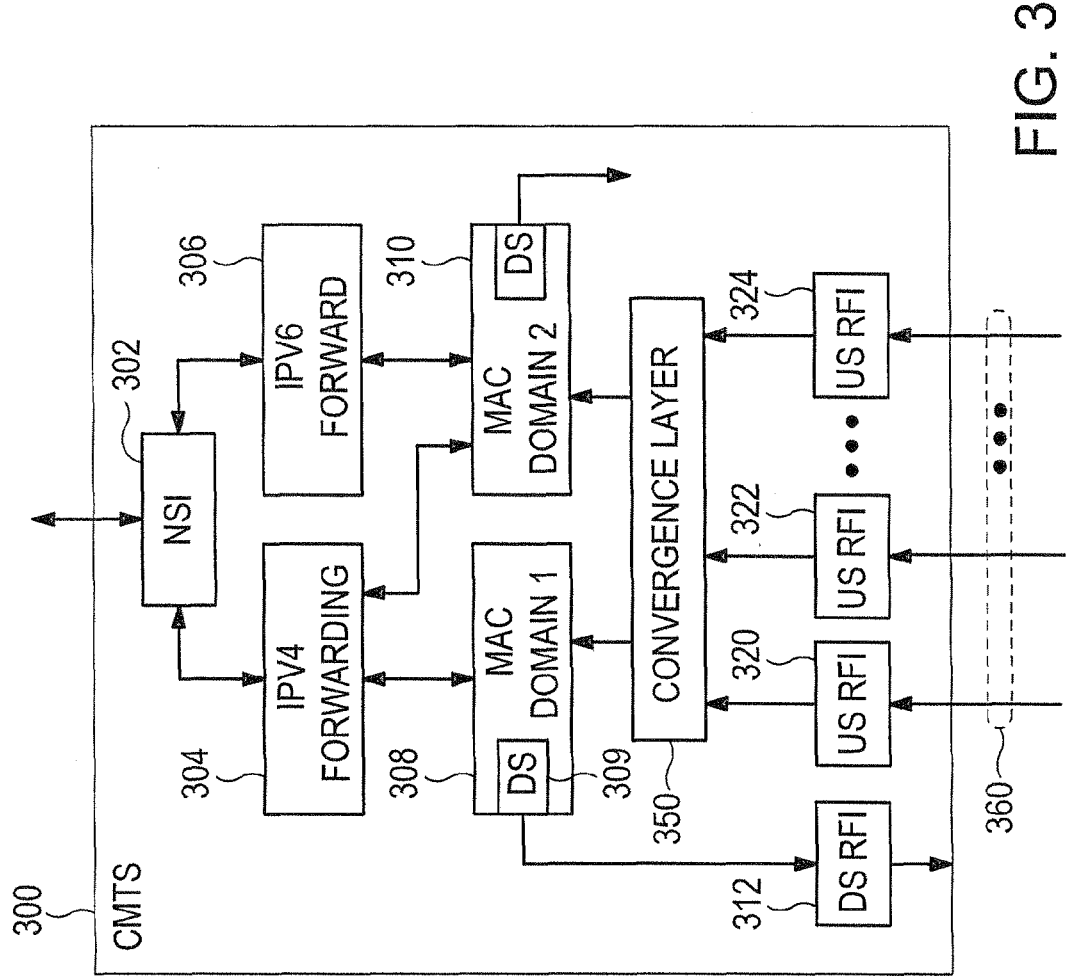
FIG. 3 is an example of a logical operational model of internal packet forwarding within a CMTS.

Referring now to FIG. 3, it depicts a logical operational model of internal packet forwarding within a CMTS. Here, a CMTS 300 includes forwarding components, for example an IPV4 forwarder 304 and IPV6 forwarder 306; there may be others not shown. A MAC domain as mentioned above is a logical sub-component of a CMTS that is responsible for implementing all DOCSIS functions on a set of downstream channels and upstream channels. A CMTS MAC Domain contains at least one downstream channel and at least one upstream channel. Here, for illustration, a MAC domain 308 and a second MAC domain 310 are shown; each coupled for directional communications with the packet forwarders 304, 306. Each MAC domain classifies downstream packets and sends them as appropriate via downstream port 309 in MAC domain 308 to an appropriate downstream channel interface (DS RFI) 312.

In the upstream direction, FIG. 3 illustrates the novel concept of a convergence layer 350, interposed between the PHY and MAC layers. In one embodiment, one MAC domain is associated with a corresponding convergence layer. Upstream carriers 360 are coupled to corresponding upstream RFI's (RF interfaces) 320, 322 . . . 324. These streams are processed in the convergence layer 350 as one or more logical blocks as further explained below.

In one example, 24 carriers might be assigned to a single logical block. In another embodiment, two logical blocks may be formed, say 18 and 6 carriers, respectively (not shown). In general, any number of carriers may be variously assigned into one or more logical blocks, as long as each block consists of at least one carrier, and each carrier is assigned to exactly one block. For illustration, the description of ranging and registration processes below assumes a single block of carriers is configured, but this is intended to be illustrative and not limiting. The allocation of carriers may be changed dynamically. In a preferred embodiment, however, once a CM has completed ranging and the carrier block or blocks have been defined, the allocation remains stable as long as the CM is online.

In DOCSIS 3.0, multiple upstream channels can share a single physical carrier, separated by ATDMA, FDMA or other techniques. Transmit opportunities for each upstream channel are independently scheduled by the CMTS, using MAP messages. Here, by contrast, a block of upstreams 360 comprises a plurality of carriers, all operated in parallel. The result is akin to a single "big pipe" which is very fast. In operation, upstream packets from all of the associated streams are processed in the convergence layer 350 so as to present a single, high bandwidth stream which in turn is forwarded to the appropriate forwarder 304, 306 and thence to the network interface port NSI 302. Since a single CM is utilizing the block of associated carriers, there is no longer any need to support the separate concept of "logical channels".

Figure 2:
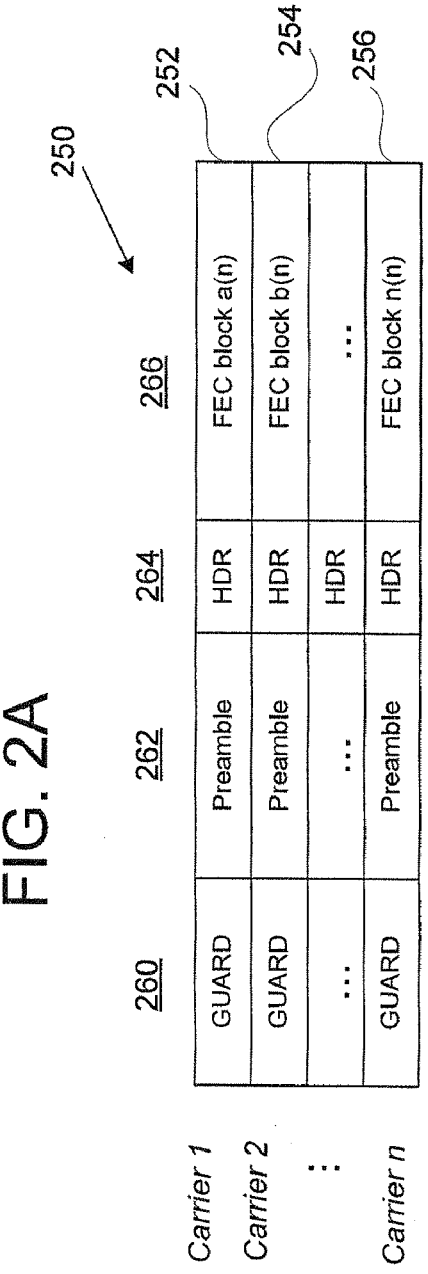
FIG. 2A is an example of a carrier configuration profile table.
FIG. 2B is an example of an upstream transmission frame.

The convergence layer 350 processes upstream transmissions in an embodiment as follows. Referring now to FIG. 2B, an upstream transmission frame 250 is shown. This frame is constructed by the transmitting CM. It maps upstream payload data, for example packet data, across one or more of the carriers within a block of carriers (1-n) assigned to the CM. The transmission side convergence layer process is further described in a detailed example below, with reference to FIGS. 9-12. (This contrasts with DOCSIS 3.0 channel bonding in which each packet is moved on a single carrier.) Preferably, all of the upstream carriers in use start transmission from the CM at the same time, relative to a common clock source, so that the transmissions received at the CMTS are synchronous with each other. The block start time may be scheduled by a new form of MAP message. In a preferred embodiment, only a single MAP message is needed for scheduling the entire block.

The upstream transmission frame 250 in this illustration includes a line or row corresponding to each one of the assigned carriers in use. Row 252 bits travel over Carrier 1, row 254 bits travel over Carrier 2, and row 256 bits travel over Carrier n. In this embodiment, each row (each carrier transmission) may include a guard field 260, a preamble 262, a header 264, and an Forward Error Correction (FEC) block. In each row, the FEC block comprises one of n parts of the upstream transmission, where n is the number of carriers in use. FEC may be employed per carrier or across carriers. Convergence layer framing is further described below.

Preambles 260 may all be the same for the frame 250. The headers 264 may share some of the attributes of known MAC headers, but they may be simplified because the carrier streams are synchronized, and therefore they cannot arrive out of order. The length (symbols) of each FEC block may vary, because the physical layer parameters of each carrier may vary, as illustrated above in Table 1. The total length (symbols) for each carrier stream may be established by reference to the corresponding CM carrier configuration profile (See FIG. 2A). Each block should end on a byte boundary.

In operation, the convergence layer 350 reads all of the incoming data, performs error checking and or correction, and reassembles the packet data or other payload into a single (high-bandwidth) data unit for forwarding as noted.

Convergence Layer on the CM Upstream Side

In an embodiment, a convergence layer algorithm (transmit side) implements the following approach. It builds an upstream frame. We call this a convergence frame. It is spread across all or a defined subset of upstream carriers. (See FIG. 2B for illustration.) The length of the frame is in symbols. The "height" of the frame is in terms of channels or carriers. The frame length is programmable and part of the profile. Applying modulation rates of, for example, Quadrature Phase-Shift Keying (QPSK) to 256QAM produce 2 to 8 bits per symbol. A frame length of 8 symbols will allow each modulation rate (carrier) to have an integral number of bytes for a given symbol rate. Small frame lengths can be had by selection of lower modulation rates. If there are a mixture, of symbol rates (they may all be the same), the algorithm would be to have at least one byte with the least symbol rate. Longer frame times make short packets less efficient. Preferably, an auto configure algorithm will try to generate the minimum frame length.

Upstream packets are mapped into FEC blocks. The packets may have DOCSIS headers. Simple concatenation is used. The order of RF channels and hence frames is listed in the US PHY Profile. Thus, each CM has a stable upstream configuration that preferably is only changed during ranging. Then, when the CM requests bandwidth, it gets a start time (and little else is necessary). The CM proceeds to transmit, beginning at the start time, over one, some or all of the carriers. To conserve energy, the CMTS may reconfigure the CM to reduce the number of upstream carriers during periods of relatively low data throughput.

A more detailed example of operation of the convergence layer on the CM side is presented next. In a preferred embodiment, the convergence layer may be implemented in hardware. That said, it may also be implemented in software or firmware for execution in a processor in the CM. For this simple example, we assume five packets are in the MAC layer transmission queue, having the sizes shown in the following Table 2:

TABLE 2

Example Loading Packets into Convergence Frames.
Note: the decimal here connotes a carrier 1-4
For example "n.3" means payload is loaded in carrier
3 of Frame n. See the narrative below.

| PACKET NO. | PACKET BYTES | Frames.carrier occupied | Bytes calculation | Cumulative bytes |
| --- | --- | --- | --- | --- |
| 1 | 250 | 1.1-18.3 | (17*14) = 238 + 12 | 250 |
| 2 | 1300 | 18.4-111.3 | 2 + (92*14) = 290 + 10 | 1550 |
| 3 | 100 | 111.4-118.4 | 2 + (7*14) = 100 | 1650 |
| 4 | 650 | 119.1-166.2 | (46*14) = 644 + 6 | 2300 |
| 5 | 180 | 166.3-179.3 | 8 + (12*14) = 168 + 12 | 2480 (179*14 = 2506) |

Building the Convergence Transmission Frame Burst

Table 2 above lists 5 packets, with their respective sizes in bytes, assumed to be in the CM transmit queue for purposes of this illustration. The CM has requested, and been granted, an upstream bandwidth allocation for this data. This is merely one simple illustration; the number of packets in the queue and their sizes are not critical for present purposes. Further, for the purposes of illustration only, we assume just four carriers have been configured as an upstream block, and that the carriers have the PHY characteristics shown in the table below.

The symbols are organized into a frame block. The algorithm states that bytes are applied to each symbol within a row within a frame block. When that row is full, the payload bytes are applied against the symbols in the next row. The nomenclature within a frame block is "row.column."

Figure 11:
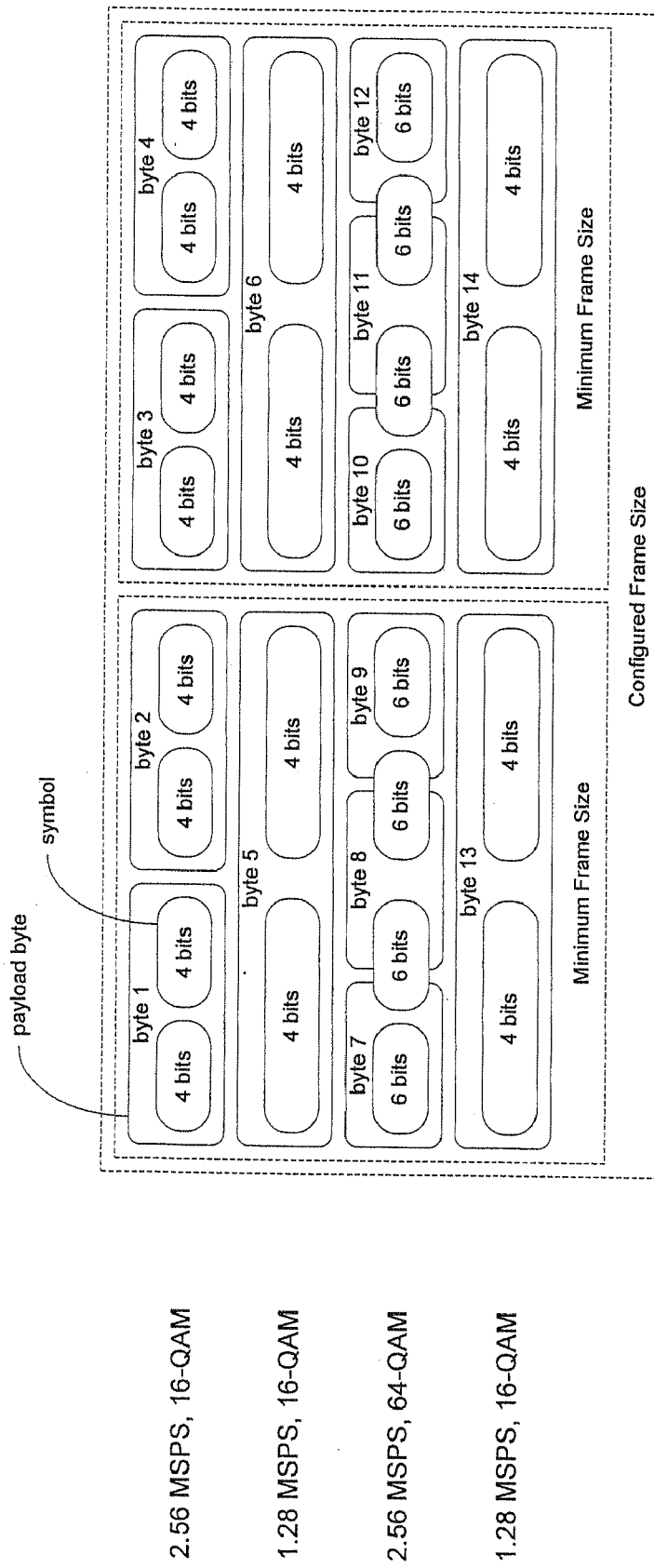
FIG. 11 is an example of configuring and loading data into a convergence frame.

Referring now to FIG. 11, the minimum frame length is chosen in a preferred embodiment so that each carrier has an integral number of bytes. The actual frame length is then an integral multiple of the minimum frame length. In the example shown in FIG. 11, a minimum frame length can be constructed with 2 bytes on carrier one, 1 byte on carrier two, 3 bytes on carrier three, and 1 byte on carrier 4. The chosen frame size is twice these values. This technique is equally applicable to either separate QAM carriers (which is the example shown) or to QAM carriers contained in an OFDM window.

TABLE 3

Symbols Per Frame Per Carrier

| CARRIER | RATE | SYMBOLS | BITS/SYMBOL | BYTES |
|---|---|---|---|---|
| 1 | 2.56 Msym/sec | 8 | 4 | 4 |
| 2 | 1.28 Msym/sec | 4 | 4 | 2 |
| 3 | 2.56 Msym/sec | 8 | 6 | 6 |
| 4 | 1.28 Msym/sec | 4 | 4 | 2 |

The process begins with allocation of packet 1 of 250 bytes. Begin at start of frame 1, carrier 1. Referring to the table above, the algorithm would load the first 4 bytes into carrier 1 and then move to carrier 2. The frame width for carrier 2 is 2 bytes per frame, so it loads another 2 bytes. Next carriers 3 and 4, carry 6 and 2 bytes, respectively. The first frame thus is loaded with a payload of 14 bytes, which fills the frame, and it is ready for transmission. See FIG. 11.

Continuing the example, the total capacity per frame is 14 bytes. So packet 1 will use ROUNDUP[250/14]=18 (17 remainder 12) frames. Accordingly, the next 224 bytes of packet 1 are loaded into a series of 16 complete frames, loading each carrier payload in sequence. Next, the remaining 12 bytes will use an additional partial frame (#18), with the last two bytes extending into carrier 3 (byte 12). In this way, packet 1 of 250 bytes is transmitted. In Table 2 above, the indication of Frames 1.1-18.3 means that the packet 1 payload is carried in 18 frames, starting at carrier 1 of frame 1, and extending through carrier 3 of frame 18.

The beginning of the next packet can be aligned with either the beginning of the next frame, the beginning of the next carrier within the current frame, or the beginning of the next byte on the current carrier. The choice depends upon the system granularity and the size of the frame. In this example, the frame is quite small and only covers four carriers. In larger systems, a frame might cover 160 carriers and may be 32 bytes in width. In such a large system, per byte granularity would be advantageous.

Next, packet 2 is 1300 bytes. For illustration, start at the beginning of the next carrier (4) within the current frame (18). The payload is ROUNDUP[1300/14]=93. Beginning now with carrier 4, frame 18, the first 2 bytes are loaded into the payload complete frame 18. The next 14 bytes are loaded sequentially as before to complete frame 19. The process repeats over the next 92 frames, sequentially, for a total of 92×14=1288 (plus 2=1290) bytes of packet 2. Finally, the remaining 10 bytes are loaded into the next frame (number 19+92=111), which fill that frame partially into carrier 3. Again, Table 2 above summarizes this range as frames 18.4-111.3.

The remaining packets 3-5 are loaded in the same manner, with the particulars reflected in Table 2 above, and the burst is completed. The total is 179 frames, or 2506 bytes of capacity (carrying 2480 bytes of actual data—the five packets). This example is illustrative and not intended to be limiting. The sequence of loading payload into a convergence layer burst is illustrated graphically by arrows in the diagram of FIG. 10.

Figure 12:
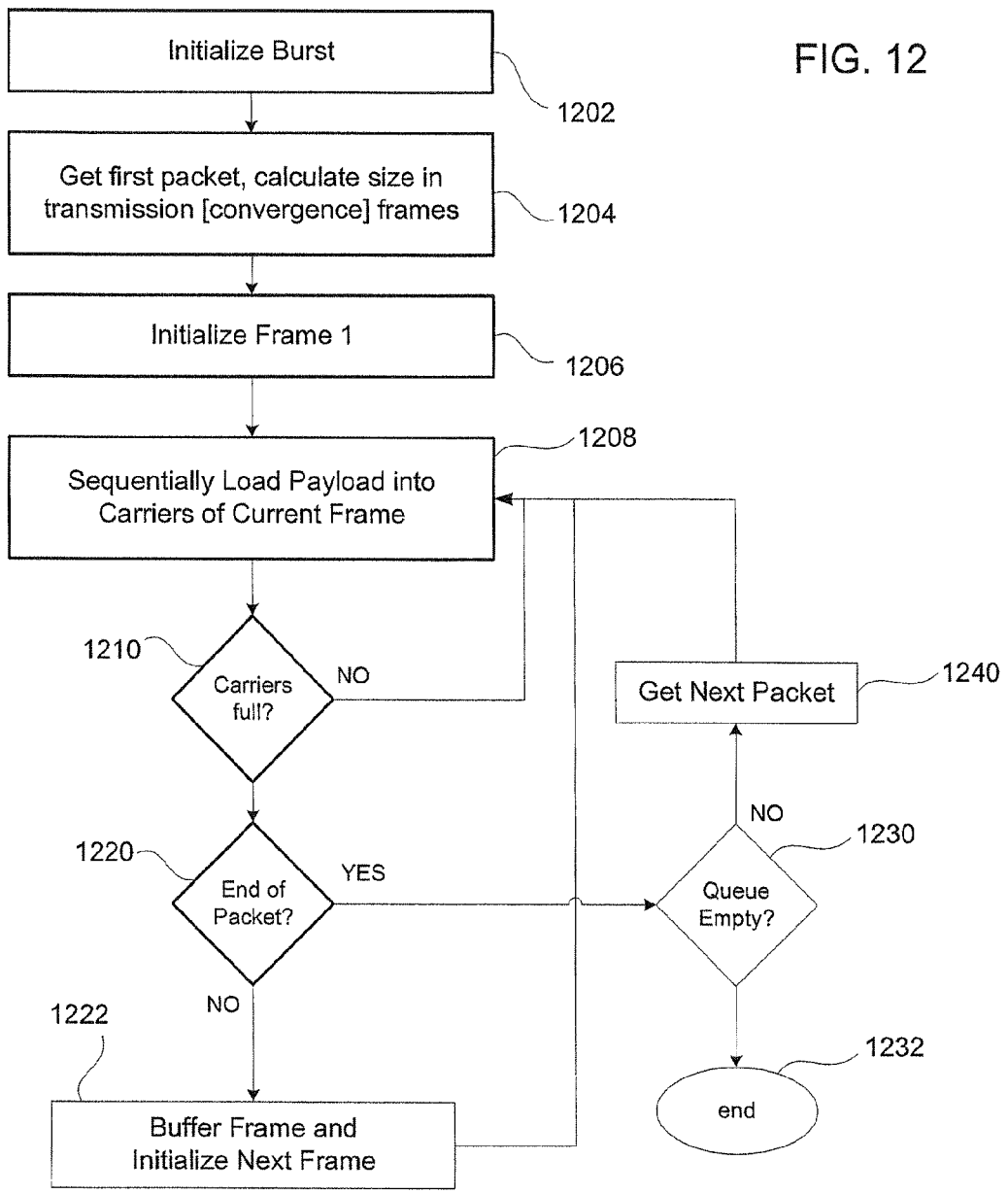
FIG. 12 is a simplified flow diagram illustrating an example of a CM convergence layer process.

The logic of the foregoing process is illustrated in the simplified flow diagram of FIG. 12. Referring to FIG. 12, a burst is initialized at block 1202. A first packet is accessed, 1204, and a first convergence layer transmission frame is initialized. Headers etc were described with regard to FIG. 2B. The packet payload is sequentially loaded into the carriers of the frame. That is, the FEC blocks are spread over the carriers as noted. Decision 1210 tests whether each carrier is full. If not, the process loops to continue loading the carriers of the current frame, block 1208. If the carriers are full, decision 1220 tests for end of the current packet. If not, the full frame may be buffered for transmission and the next frame initialized, block 1222. This process may vary from the flow diagram in other embodiments, for example depending on whether the policy begins with the next packet aligned with the beginning of the next frame, the beginning of the next carrier within the current frame, or the beginning of the next byte on the current carrier. In the illustrated embodiment, the process then loops to 1208 to continue loading payload of the current packet into the next frame, etc, until the end-of-packet test at decision 1220. Decision 1230 tests whether the MAC transmit queue (the scheduled packets) have been completed. If so, the burst ends, 1232. If there are more packets pending, the next packet is accessed, block 1240, and the process again loops to 1208 for loading that packet.

Initial Ranging & Station Maintenance

Ranging is performed for all channels. This may be accomplished by the CM transmitting on all channels at once. The CMTS measures attenuation, group delay, and other parameters, and passes the results back to the CM, as explained in more detail below. CMs that are experiencing severe attenuation may have to modify the configuration parameters of certain channels, for example reducing the QAM rate or channel width. For example, the CMTS may command more FEC bits, different modulation, etc., responsive to the measured parameters. In an extreme case, a channel may be removed from the group. Unused channels, however, cannot be used by another CM.

In existing systems, a CM Transmit Channel Profile (TCP) is implemented. It lists the carriers in use by each CM. In addition, DOSCIS 3.0 defines an IUC (Interval Usage Code), which is a field in MAP messages and UCD's that links burst profiles to upstream spectrum grants. A Upstream Channel Descriptor (UCD) in DOCSIS 3.0 describes each carrier individually. It typically contains a center frequency value and a set of burst profiles (unique per IUC). And, a Transmit Channel Configuration (TCC) contains a list of carriers.

Figure 4:
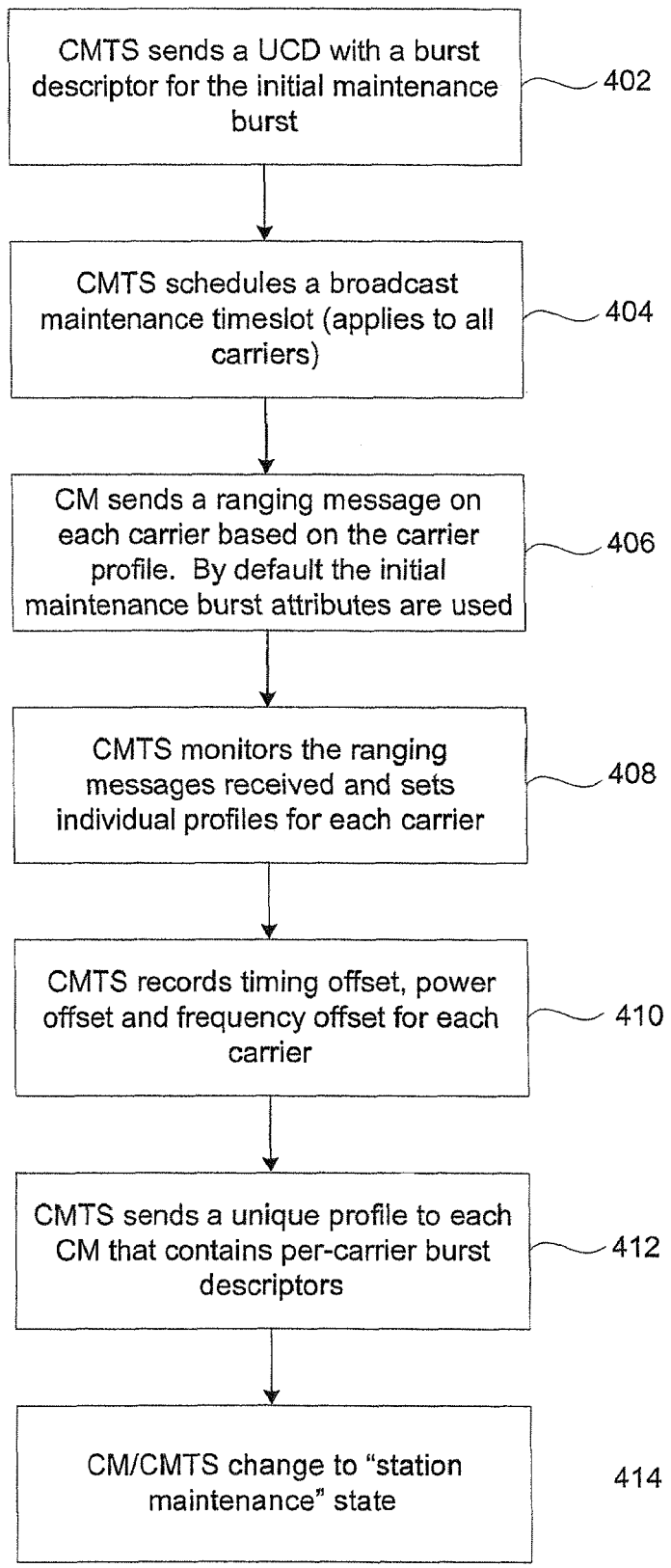
FIG. 4 is a simplified example flow diagram illustrating an initial ranging process.

In an embodiment, we propose a modified process for initial ranging, described next with reference to FIG. 4. Referring now to FIG. 4, a CMTS sends an upstream channel descriptor (UCD) with an initial maintenance burst descriptor, block 402. The specified initial burst parameters should be very conservative so that all channels are likely to have successful transmission. The UCD may appear similar to a conventional UCD, but the CM will apply it across all the carriers of a logical block. Note this multiple-carrier UCD is per CM as opposed to global. It could be sent in a global message. The CMTS also schedules a broadcast maintenance timeslot, block 404. This timeslot will apply to all the carriers within a block, so the messaging protocol may be simplified. For example, a single MAP message may be used to schedule the broadcast maintenance timeslot for all of the carriers in the group.

Further, in an embodiment, the burst descriptor may be modified to reflect the needs of OFDM. FEC may be per carrier or across carriers in an alternative embodiment. No longer would a separate UCD be necessary per carrier. Rather, one (or more) UCDs may be used that list the common group of carriers. (Again see TABLE 1 as one example.) In an embodiment, the TCC still includes a list of carriers. Again, the list is per CM; that is, there is a separate list of assigned carriers for each CM.

Again referring to FIG. 4, a CM may send a ranging message on each carrier, as indicated at block 406, based on the corresponding carrier profile. See FIG. 2A for an example. By default, the initial maintenance burst attributes may be used. The CMTS monitors the ranging messages received (from its MAC domains), block 408, and sets individual profiles for each carrier based the received messages. If the CMTS does not receive a ranging message, it may leave the corresponding carrier in the "initial maintenance" burst profile. The CM is assumed to keep on sending requests on that channel until the profile is set up. In the worst case, the channel may not be used.

The CMTS also records timing offset, power offset and frequency offset for each carrier, block 410. See FIG. 8 as an example. Then the CMTS creates and sends a unique profile to each CM that contains per-carrier burst descriptors, block 412. This contrasts with DOCSIS 3.0 where burst descriptors per carrier are transmitted globally. Preferably, we limit global transmission to initial ranging. Finally, the CMTS switches to a "station maintenance" state, block 414. To summarize, in a preferred embodiment, initial ranging protocols may be simplified, and messaging traffic dramatically reduced, by implementing and managing multiple upstream channels as a single logical block of upstream channels. As one example, the ranging response messaging, which requires a MAC management message per channel per DOCSIS 3.0, may be replaced by sending a unique profile to each CM, in a single message that contains per-carrier burst descriptors.

Figure 5:
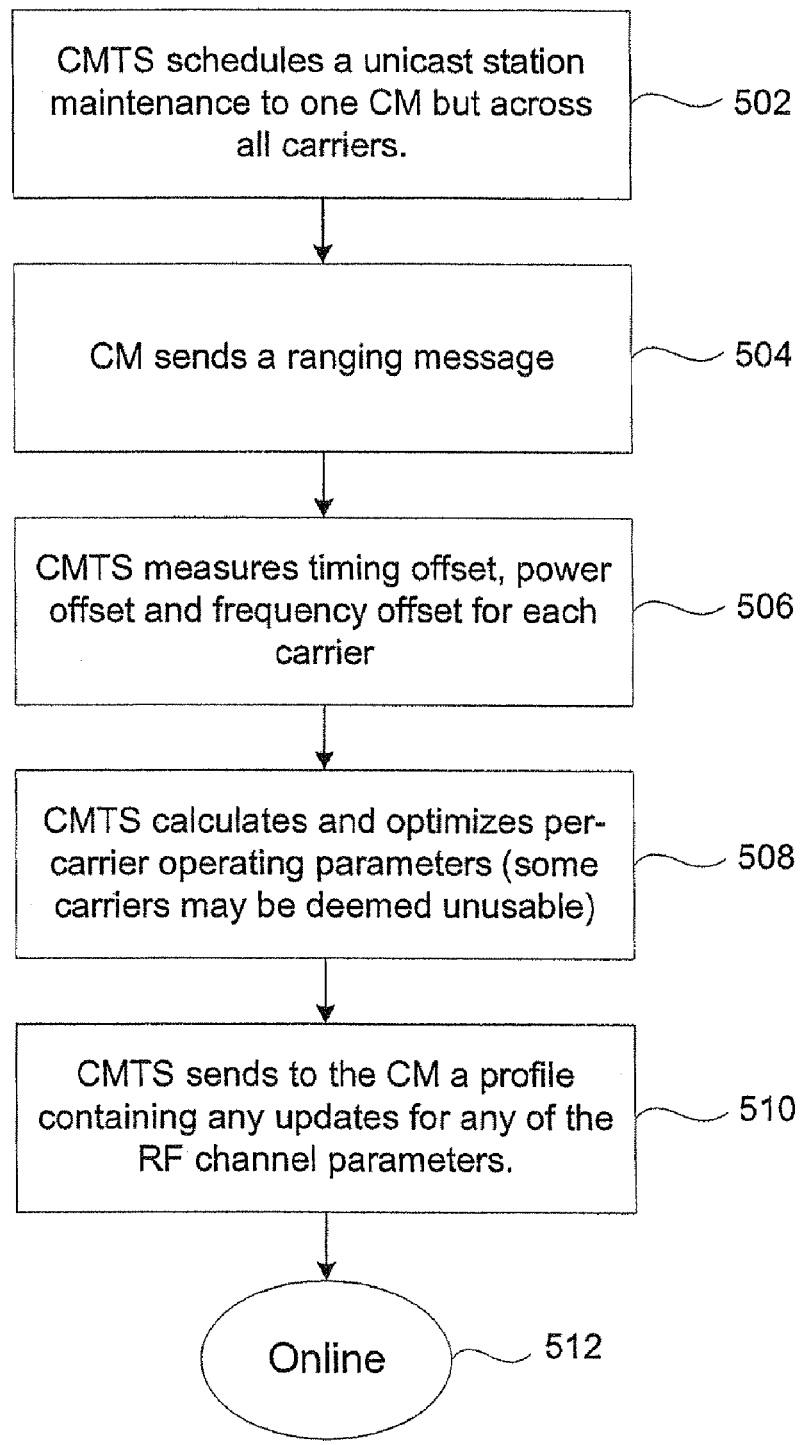
FIG. 5 is a simplified example flow diagram illustrating a station maintenance process.

Referring now to FIG. 5, in the station maintenance state, the CMTS schedules a unicast station maintenance slot to a CM, block 502. However, unlike DOCSIS 3.0, the maintenance slot is applicable across all the carriers of the corresponding CM carrier group. The duration of the station maintenance slot preferably is based on the time it takes to transmit a station maintenance message at the slowest channel profile.

The corresponding CM sends a ranging message as scheduled, block 504, on all of the carriers. Responsive to receiving the ranging message, the CMTS measures timing offset, power offset and frequency offset for each carrier, block 506. Notice how these protocols may substantially reduce configuration and maintenance traffic by operating across all the carriers of a block of channels as a single logical channel. Further, the CMTS may calculate and optimize per-carrier operating parameters, block 508. For example, some carriers may be deemed unusable. In an embodiment, the CMTS may also send an updated profile to the CM containing any updates for any (or all) of the RF channel parameters, block 510. The details of these messages are a matter of design choice. They may be implemented as variations within the general outlines of the DOCSIS 3.0 station maintenance protocols, or they may depart from it in new implementations. At the conclusion of station maintenance process, the subject CMs are changed to state online, indicated at 512 in the drawing.

In an embodiment, there may be "odd and even" upstream PHY profiles. This refers to two different configurations for the same set of carriers. This would allow the CM to make a request prior to a ranging interval and get a grant after a ranging interval. The MAP will have to indicate odd or even profile. Accordingly, a re-ranging process may be undertaken for the profile that is not currently in use, and the a changeover time scheduled to switch to the new configuration. In this way, packets that are in-flight are not lost in the changeover.

Figure 6:
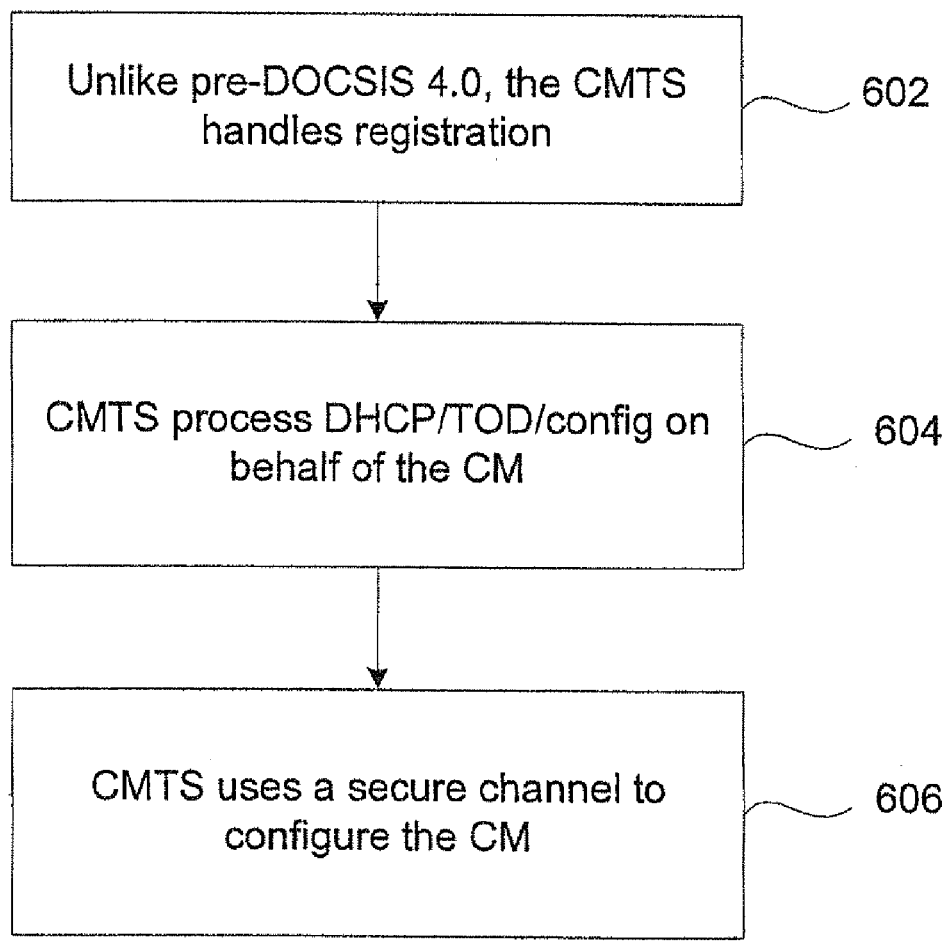
FIG. 6 is a simplified example flow diagram illustrating a CM registration process.

FIG. 6 is a simplified flow diagram illustrating a CM registration process. The CMTS handles registration in this new environment in block 602. CMTS participation in registration may ameliorate some current security issues. Further, this approach is expected to reduce the frequency of software updates to the CM. This design option pertains to upper layers of software, and is independent from the lower layers discussed earlier. Referring the block 604, the CMTS would process Dynamic Host Configuration Protocol (DHCP), Time Of Day (TOD) and configuration operations on behalf of the CM. In an embodiment, the CMTS may use a secure channel to configure the CM, block 606.

Network Management Note

In some embodiments, an upstream channel block may be reflected in a single Management Information Base (MIB) entry for the whole MAC block, rather than a full MAC MIB for each carrier as in the past. This strategy may simplify debugging and deployment, as well as increase throughput. In an embodiment, each carrier may have a separate MIB (or a separate entry within a larger MIB) for PHY variables, but preferably not for MAC or traffic variables.

Request-Grant Mechanism, Scheduling and Transmission

A request for upstream bandwidth may be made in terms of only new bytes, or for a number of bytes in the upstream transmission queue. The requests may be passed from CM to CMTS via piggyback requests or polling. Preferably, contention based requests are avoided. Since bandwidth is used for polling in any event, the CM should report all bytes in its outgoing buffer.

Polling algorithms may be optimized on various criteria. For example, relatively active CMs may be polled more frequently than others. Thus there may be a fast poll loop for active CMs, and a slow poll loop for inactive CMs. Here we use "fast" and "slow" as relative to each other, without regard to any specific polling frequency. Once a data flow is initiated, piggybacking may be used to assure high performance and low latency.

In DOCSIS 3.0, CMTS upstream scheduling is done in units of time (such as minislots). This reflects the fact that the scheduler's main job is time multiplexing, as mentioned above. In an embodiment of the present disclosure, an upstream allocation is across all channels, or a defined subset (block) of channels. At the appointed start time, the CM has exclusive use of the designated channels. And all of the carriers have the same stop time. Indeed, they operate synchronously, as shown in more detail below.

Preferably, the CM should request amounts of bytes that correspond to packet thresholds (for example, 1500, 3000, 4000, etc.). We call this Packet Boundary Requests (PBR). It avoids packet fragmentation, again simplifying operation and reducing overhead. In one embodiment, the requested number of bytes is converted to time at the CMTS. This conversion is unique per CM, because the conversion depends on the CM's specific carriers, modulation, symbol rate, etc. Actual bandwidth congestion calculation is in terms of time. In this environment, a MAP could be over a long time interval. The MAP would have a single timing offset at the beginning of the MAP, at which time all the carriers begin concurrent transmission. Thus the present scheduling approach may result in a simplified MAP format, and a simplified scheduling process in the CMTS.

To avoid fragmentation, a request preferably has multiple threshold numbers of bytes ("thresholds"). Each threshold represents a packet boundary, when the upstream is packet data. Each threshold may contain one or more packets. The CMTS should provide a method or algorithm to the CM as to how the thresholds should be chosen. As an example, assume a CM has 1000 small packets. Some alternative strategies are as follows:

1. Set a maximum number of thresholds. For example, 10. This sets the maximum REQ message size.
2. Evenly distribute thresholds.
3. Set minimum and maximum size of thresholds. For example, a minimum size of 250 bytes may be useful because the CMTS may not want to grant less than that for large transfers. A maximum size may be on the order of 2000 bytes because the CMTS may not want to do larger grants.

In one presently preferred embodiment, an even distribution of thresholds is used, with a maximum number of thresholds. The CMTS may grant an amount not equal to the exact threshold. With 32 upstream carriers for example, bytes are granted in units of 32, so there is typically some round-off error. The number of carriers may vary, as discussed, so the threshold and grant sizes may vary accordingly. If the CMTS does not observe thresholds, then there may be more inefficiencies in the system with large upstream packets.

In a preferred embodiment, multiple outstanding requests may be permitted for a more efficient pipeline. The request size preferably is responsive to new bytes in the CM buffer, rather than incur the overhead of constantly reporting buffer depth. Multiple grant mode may be permitted in the context of Packet Boundary Requests (PBR), i.e., while still avoiding fragmentation. A CM may repeat requests after a predetermined time-out expires. In an alternative embodiment, the CM can re-request and piggyback is not required.

Figure 7:
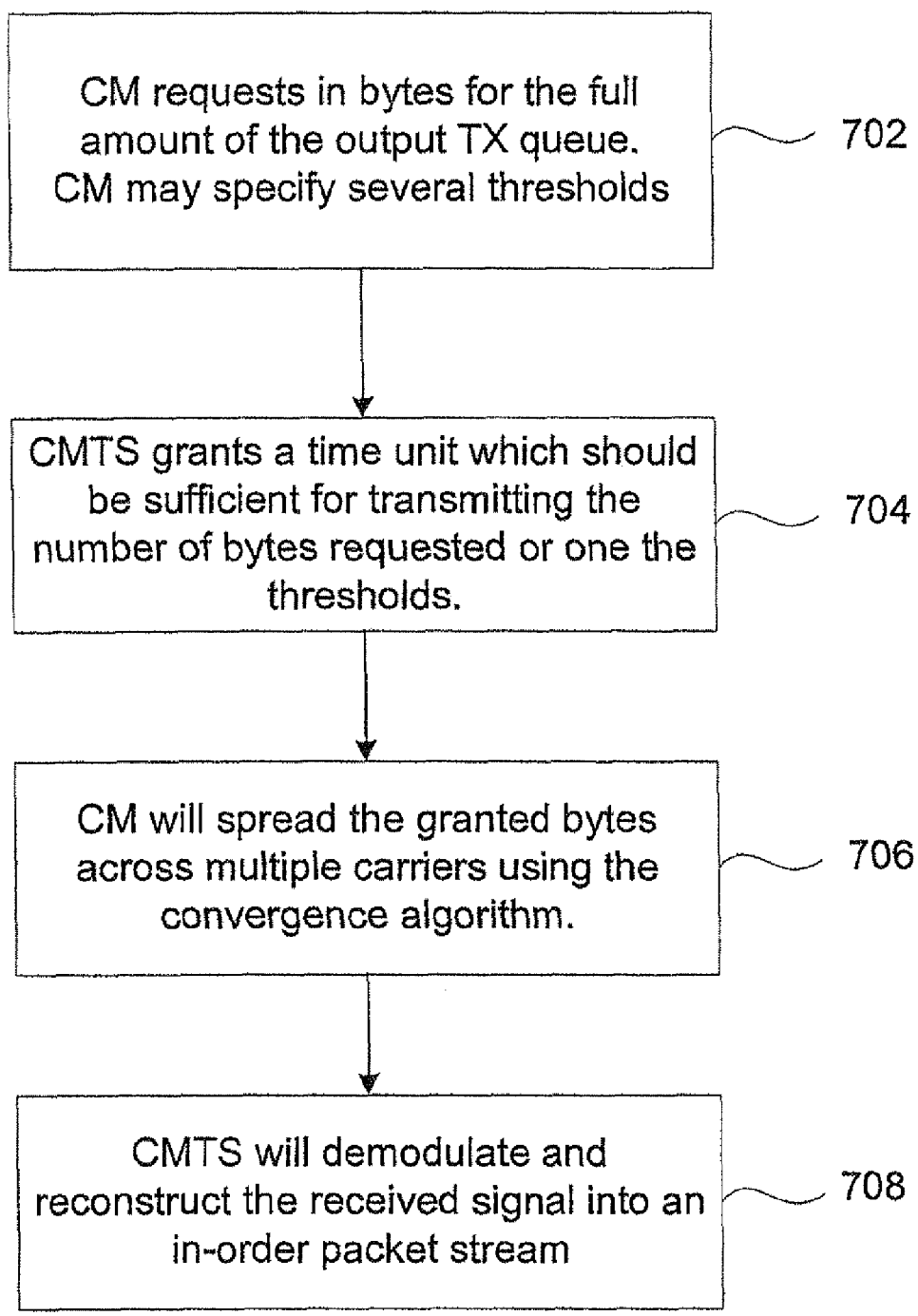
FIG. 7 is a simplified example flow diagram illustrating an upstream data transmission process.
Figure 10:
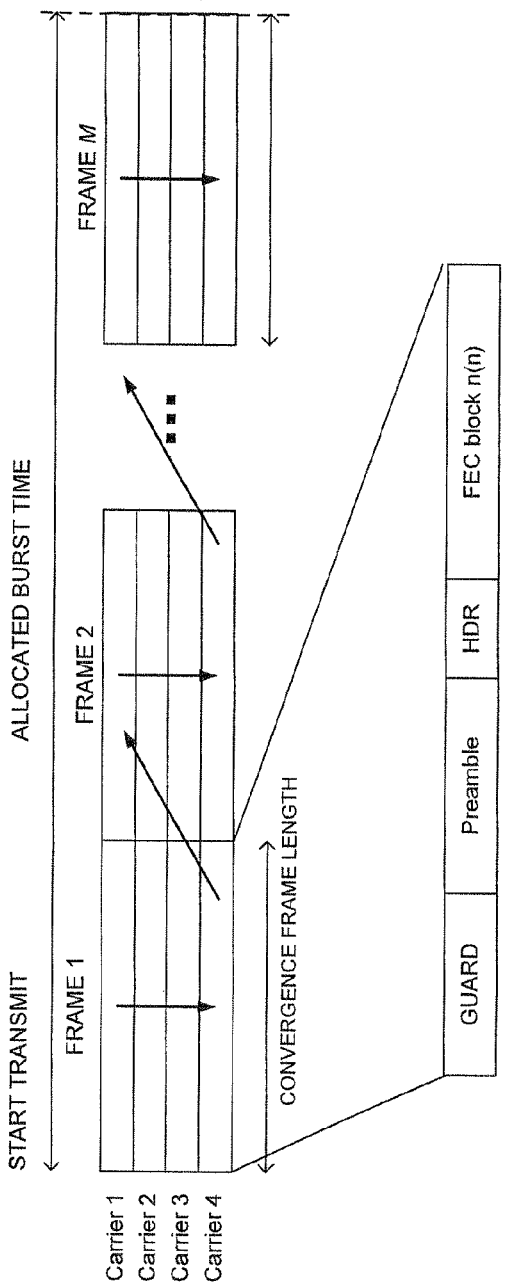
FIG. 10 is a conceptual illustration of an example of a synchronized upstream transmission burst over a designated block of carriers.
Figure 9:
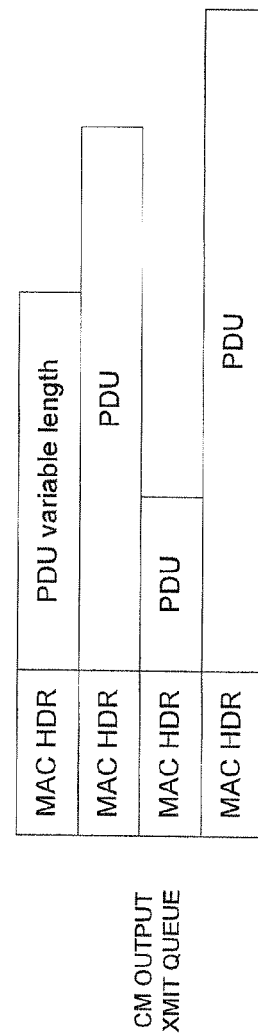
FIG. 9 is a simplified example illustrating a CM transmission output queue.

Referring now to FIG. 7, in an illustrative data transmission operation, the CM requests sufficient bytes for the full amount of its output transmission queue, see block 702. It may specify one or more threshold numbers of bytes as mentioned. (A simplified illustration of an output queue is shown in FIG. 9.) The CMTS (scheduler) grants a time unit that is sufficient for the total bytes requested, or one of the thresholds, see block 704. The CM spreads the granted bytes across the multiple carriers using a predetermined convergence algorithm. The algorithm should take into account the various PHY level parameters discussed above. For example, given the carrier profiles and bandwidths, the convergence layer can seek to have all carriers complete transmission near the same time. Put another way, it can optimize transmission time, see block 706. The CMTS (PHY/convergence layer), after transmission begins, will demodulate the signals and reconstruct the received signal into an in-order packet stream, block 708, as further discussed above with reference to FIG. 3.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor in a CMTS or CM. More specifically, by the term "digital computing system," we mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. We claim all modifications and variations coming within the spirit and scope of the following claims.

The invention claimed is:

1. An apparatus comprising:
a network interface for sending and receiving data to and from a network;
at least one forwarder coupled to the network interface configured to forward data packets to and from the network interface in accordance with a selected protocol;
a Media Access Control (MAC) layer logic configured to manage data transmission services between the forwarders and a set of Cable Modems (CMs);
a plurality of upstream Radio Frequency (RF) channel interfaces configured to receive respective upstream carrier transmissions from a CM;
a processor configured to designate a plurality of the upstream carriers for concurrent, synchronous use as a single logical block; and
convergence layer logic configured to receive upstream transmissions from the upstream RF channel interfaces, and assemble data from all of the logical block of upstream carriers for presentation to the MAC layer logic as a single stream.

2. The apparatus of claim 1 wherein all of the logical block of upstream carriers are synchronized so that all of the upstream transmissions start transmission from the associated CM at a common start time, relative to a common clock source.

3. The apparatus of claim 2 wherein:
the upstream transmission from the CM comprises an upstream convergence frame, the upstream convergence frame including packet data that are spread over all of the upstream carriers of the single logical block; and
the convergence layer logic assembles data from the convergence frame so as to recover the packet data and present it in correct order to the corresponding MAC domain logic as a serial stream.

4. The apparatus of claim 2 further comprising a scheduler for scheduling upstream transmissions, wherein the scheduler schedules transmission over a logical block of upstream carriers concurrently and beginning at a common start time reflected in a single bandwidth allocation map (MAP) message.

5. The apparatus of claim 2 and wherein the RF channel interfaces are operable at frequencies approximately in a range of 5-200 MHz for the upstream channel transmissions.

6. The apparatus of claim 1 further comprising downstream RF interfaces operable in a range of frequencies greater than approximately 200 MHz.

7. An apparatus comprising:
transceivers for transmitting and receiving RF signals, to use a plurality of RF carriers at different center frequencies;
means for receiving an upstream configuration profile from a Cable Modem Termination System (CMTS) that designates at least two of the carriers for use together as a logical upstream carrier block; and
means for operating the transceivers to transmit data upstream concurrently and synchronously over all of the designated carriers of the logical upstream carrier block, all of the designated carriers beginning and ending transmission at substantially the same time.

8. The apparatus of claim 7 wherein:
the apparatus is configured to implement a convergence frame for upstream transmissions;
the upstream convergence frame is spread across all of designated carriers of the logical upstream carrier block, so that the height of the convergence frame equals the number of carriers; and
the convergence frame length is selectable.

9. The apparatus of claim 8 wherein upstream packets are mapped into Forward Error Correction (FEC) blocks, and the FEC blocks are spread down the convergence frame across the designated carriers of the logical upstream carrier block.

10. The apparatus of claim 9 wherein the convergence frame width is selected so that each of the FEC blocks ends on a byte boundary, and the frame width is minimized.

11. The apparatus of claim 8 wherein a common transmission start time for the designated carriers is determined by a single bandwidth allocation map (MAP) message received in the CM.

12. The apparatus of claim 8 wherein a Cable Modem (CM) implements more than six upstream carriers, operable as a synchronous, common block, and the upstream carriers have respective center frequencies within a range of approximately 45 MHz to 300 MHz.

13. A method, comprising:
receiving an upstream bandwidth request from a Cable Modem (CM) in terms of bytes;
converting the upstream request into time, based on a carrier configuration profile associated with the requesting CM, wherein the configuration profile includes symbol rate and modulation parameters for each one each of a block of carriers;
responsive to the converted request, granting time to the CM, wherein the time allocation applies over of the block of carriers;
transmitting a single bandwidth allocation map (MAP) message to the CM specifying a common start time for all of the block of carriers; and
receiving an upstream transmission from the CM based on the MAP message, wherein the upstream transmission is received over all of the block of carriers concurrently, beginning at the common start time.

14. The method of claim 13 and further comprising:
processing the transmission on each participating carrier in the block of carriers according to a corresponding carrier configuration profile to recover corresponding payloads; and
concatenating the corresponding payloads to form a serial data stream.

15. The method of claim 14 and further wherein:
the payloads include a Forward Error Correction (FEC) block of packet data; and the concatenation of the payloads form an in-order packet stream by concatenating the payloads in a predetermined order.

16. The method of claim 14 and including polling the CMs to receive the upstream bandwidth request; wherein the polling includes a fast poll loop for active CMs, and a slow poll loop for inactive CMs.

17. The method of claim 14 and wherein the upstream bandwidth request includes at least one threshold number of bytes, and the number of thresholds is within a predetermined maximum number of permitted thresholds so as to limit a size of the upstream bandwidth request.

18. The method of claim 13 and further comprising:
during initial ranging operations, assigning an upstream configuration to the CM that defines a common block of Radio Frequency (RF) carriers for use by the CM; and
maintaining the assigned upstream configuration until a new ranging request is received from the CM.

19. The method of claim 18 including storing the common block of RF carriers as a single Management Information Base (MIB) entry in the Cable Modem Termination System (CMTS).

* * * * *